Oct. 22, 1935.    L. A. SMITH ET AL    2,018,286
LUBRICATOR
Filed April 3, 1933
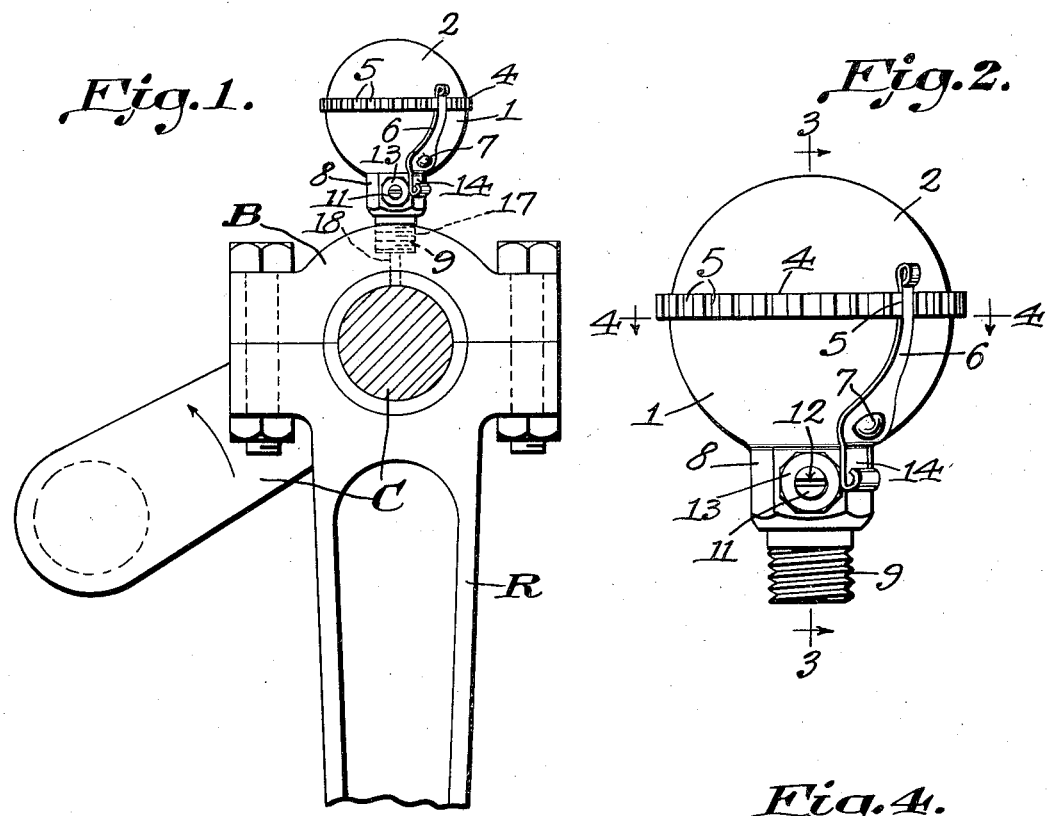
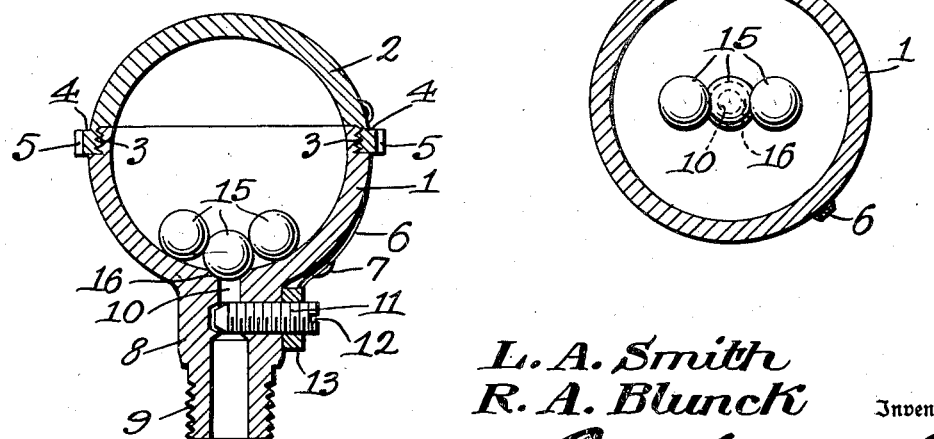
L. A. Smith
R. A. Blunck   Inventors
By C. A. Snow & Co.
           Attorneys.

Patented Oct. 22, 1935

2,018,286

UNITED STATES PATENT OFFICE 2,018,286

LUBRICATOR

Lester A. Smith and Robert A. Blunck, Grandmound, Iowa

Application April 3, 1933, Serial No. 664,268

4 Claims. (Cl. 184—69)

This invention relates to a lubricator designed primarily for use in connection with oscillating bearings such, for example, as connections between cranks and connecting rods, etc.

It is an object of the invention to provide a lubricator containing freely movable means whereby the lubricant can be kept in a mixed state, and can be intermittently released through an outlet to the surfaces to be lubricated.

A still further object is to provide freely movable means within the lubricant cup or container for exerting a minute pushing action upon the lubricant in the outlet, thereby to feed it forcibly into the bearing.

Another object is to provide freely movable means within the container for producing an audible signal when the lubricator is empty.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing:

Figure 1 is an elevation of a bearing to which the present improvement is applied.

Figure 2 is an enlarged elevation of the lubricator.

Figure 3 is a section on line 3—3, Figure 2.

Figure 4 is a section on line 4—4, Figure 2.

Referring to the figures by characters of reference 1 and 2 designate the base and cap sections of a spherical container, these sections being detachably joined by means of screw threads 3, the base section 1 being reduced annularly and screw-threaded so as to fit within a threaded bore in the edge portion of the cap portion 2. A flange 4 is extended around the edge portion of cap 2 and is notched as shown at 5 so as to receive a spring finger 6 fastened at 7 to the base 1.

A neck 8 extends from the center of the base 1 and merges into a screw-threaded nipple 9. An outlet passage 10 is extended through the neck and nipple and the flow of lubricant therethrough is adapted to be controlled by a screw valve 11 arranged radially within the neck 8 and movable across the passage. This screw may be adjusted by inserting a screw-driver into a kerf 12 in the outer end of the screw. A lock nut 13 can be mounted on the screw valve and this nut can be held normally against rotation by a locking tongue 14 made integral with the finger 6. This is shown clearly in Figures 1 and 2.

Loosely mounted within the base 1 are balls 15 one of which is adapted normally to rest upon a seat 16 at the inlet end of the passage 10. This position of the ball has been shown in Figures 3 and 4. In practice from two to four balls can be used to advantage. In the structure illustrated three balls have been shown.

A bearing B at one end of a connecting rod R has been illustrated in Figure 1, this bearing being in engagement with a crank C shown in section. The lubricator is mounted on the bearing B with the nipple 9 seated in a counterbore 17 formed in the bearing. This counterbore opens through a duct 18 to the cooperating bearing surfaces so that lubricant delivered from the lubricator can flow to said surfaces.

By springing finger 6 out of engagement with the notched flange 4, the cap section 2 can be unscrewed and a suitable lubricant placed in the base section 1 where the balls 15 are located. The cap can then be replaced and locked by means of finger 6. Valve 11 is of course adjustable to circulate the flow of lubricant through the passage 10.

During the oscillation of the bearing B the balls 15 will be shifted along the bottom surface of base section 1 and will intermittently move away from and back onto seat 16. Thus the balls act to keep the lubricant in an agitated condition and every time a ball moves away from the seat a portion of lubricant will be free to enter passage 10. Thereafter one of the balls will travel down onto the seat and will act not only to cut off the supply of lubricant to the passage but will also act to a small extent as a plunger for exerting a slight pressure against the lubricant in passage 10, thereby tending to expel a small quantity of the lubricant from the duct 18.

This lubricator can be used with equal efficiency in connection with oil or grease and it has been found in practice that it has resulted in a considerable saving of lubricant which otherwise might be and generally is delivered to the bearing more rapidly than is necessary.

An especially advantageous feature of this lubricator is the fact that when the base 1 becomes nearly empty and the lubricant has drained from around all but the lower ball at the outlet, the remaining balls, which are supported by the lower ball above the level of the lubricant, will pound upon the wall of the container and direct attention to the fact that the device is in need of replenishing.

Obviously when the mechanism is not in motion one of the balls will engage the seat 16 so that there will be no unnecessary lubrication. This is especially advantageous where a lubricating oil is used.

What is claimed is:

1. The combination with a bearing member mounted for back and forth movement, of a lubricator shiftable therewith, said lubricator including a closed container having an outlet, and freely movable balls within the container any one of which is adapted to close the outlet and support the remainder above the level of the outlet to freely pound the wall of the lubricator when nearly or entirely empty.

2. The combination with a bearing member mounted for back and forth movement, of a lubricator shiftable therewith, said lubricator including a container comprising detachably connected base and cap sections, there being a lubricant outlet in the base section provided with a seat at its inlet end, a valve for controlling the flow of lubricant through the outlet, and freely movable balls housed by the sections, each of the balls constituting a means for engaging the seat to close the outlet and support the remainder of the balls above the level of the outlet and lubricant when the lubricator is nearly empty, thereby to freely pound the wall of the lubricator to signal the user.

3. The combination with a bearing member mounted for back and forth movement, of a lubricator shiftable therewith, said lubricator including a lubricant container having an outlet and balls freely movable in the outlet, any one of the balls constituting a closure for the outlet, said balls being normally submerged in lubricant and adapted, when lubricant is drained from around all but one of the balls, to pound upon the wall of the movable container to sound a signal.

4. The combination with a bearing member mounted for back and forth movement, of a lubricator shiftable therewith, said combined lubricator and signal device comprising a resonant container having detachably connected base and cap sections, there being a lubricant outlet in the base section provided with a seat at its inlet end, a valve for controlling the flow of lubricant through the outlet, and freely movable balls housed by the sections and formed of a material which, when thrown against the wall of the container by the back and forth motion of the bearing member, will produce an audible signal, each of the balls constituting a means for engaging the seat to close the outlet and support the remainder of the balls above the level of the outlet and lubricant when the lubricator is nearly empty, whereby the supported balls are free to pound the wall of the lubricator above the level of the lubricant to produce a signal.

LESTER A. SMITH.
ROBERT A. BLUNCK.